United States Patent
Davenport

(10) Patent No.: US 7,231,132 B1
(45) Date of Patent: Jun. 12, 2007

(54) TRICK-MODE PROCESSING FOR DIGITAL VIDEO

(75) Inventor: William Davenport, Burlington, MA (US)

(73) Assignee: Seachange International, Inc., Acton, MA (US)

(*) Notice: Subject to any disclaimer, the term of this patent is extended or adjusted under 35 U.S.C. 154(b) by 1328 days.

(21) Appl. No.: 09/688,939

(22) Filed: Oct. 16, 2000

(51) Int. Cl.
*H04N 5/91* (2006.01)

(52) U.S. Cl. .......................... 386/68; 386/111; 386/81; 375/240.14

(58) Field of Classification Search .................... 386/6, 386/7, 27, 33, 46, 48, 67–68, 81–82, 109, 386/111–112, 125–126; 375/240.14
See application file for complete search history.

(56) References Cited

U.S. PATENT DOCUMENTS

| | | | | |
|---|---|---|---|---|
| 5,377,051 A | * | 12/1994 | Lane et al. ..................... | 386/81 |
| 5,479,303 A | | 12/1995 | Suzuki et al. | |
| 5,585,931 A | * | 12/1996 | Juri et al. ..................... | 386/33 |
| 5,659,539 A | | 8/1997 | Porter et al. | |
| 5,687,275 A | * | 11/1997 | Lane et al. ..................... | 386/68 |
| 5,887,110 A | | 3/1999 | Sakamoto et al. | |
| 5,903,263 A | | 5/1999 | Emura | |
| 6,031,960 A | * | 2/2000 | Lane ........................... | 386/68 |
| 6,058,240 A | * | 5/2000 | McLaren ..................... | 386/68 |
| 6,122,433 A | * | 9/2000 | McLaren ..................... | 386/68 |
| 6,201,927 B1 | * | 3/2001 | Comer ......................... | 386/68 |
| 6,219,381 B1 | * | 4/2001 | Sawada et al. ........ | 375/240.14 |
| 6,389,218 B2 | * | 5/2002 | Gordon et al. ................ | 386/68 |
| 6,445,738 B1 | * | 9/2002 | Zdepski et al. ............... | 386/68 |
| 6,621,979 B1 | * | 9/2003 | Eerenberg et al. ............ | 386/68 |
| 6,654,539 B1 | * | 11/2003 | Duruoz et al. ................ | 386/68 |

FOREIGN PATENT DOCUMENTS

EP     0 812 112 A2     12/1997

OTHER PUBLICATIONS

Foreign Search Report, Jun. 25, 2002.
Apostolopoulos, et al. "Supporting Interactive Scanning Operations in VOD Systems". SPIE vol. 3310, pp. 84-94, Jan. 1998.
International Telecommunication Union; Transmission of Non-telephone signals; *Information Technology-Generic Coding of Moving Pictures and Associate Audio Information: Video*; ITU-T Recommendation H.262; (Jul. 1995).

* cited by examiner

*Primary Examiner*—James J. Groody
*Assistant Examiner*—Christopher Onuaku
(74) *Attorney, Agent, or Firm*—Proskauer Rose LLP

(57) ABSTRACT

A method for processing digital video data intended for normal mode display to obtain corresponding digital video data for trick-mode display includes modifying the normal mode digital video data to achieve a substantially uniform delivery rate to a video client. This results in smoother trick-mode playback. The modified normal mode digital video data is saved as a trick-mode file. When trick-mode playback is requested, a video-server retrieves data from the trick-mode file.

24 Claims, 3 Drawing Sheets

TRICK-MODE PROCESSING FOR DIGITAL VIDEO

This application relates to processing digital video, and in particular, to the display of digital video files in fast-forward or rewind mode.

BACKGROUND

When viewing a film, it is often desirable to skip over uninteresting scenes or, conversely, to rewind the film to repeat certain scenes. As a result, virtually all video playback units include fast-forward and rewind controls that enable the viewer to rapidly move forward or backward along the film.

However, without the ability to identify selected portions of the film, it is difficult for a viewer to determine how long to operate in fast-forward or rewind mode. To address this difficulty, virtually all video playback units provide some position-indicating feedback to the viewer. A particularly useful method of providing such feedback is to continue displaying the film when operating in fast-forward or rewind. These two types of displays are collectively referred to in the industry as "trick-mode" displays.

In both analog and digital video delivery systems, an ordered sequence of images is shown to the viewer at a rate (approximately 24 images per second) that is fast enough to give the user the illusion of motion. Aside from the improved image and sound quality associated with digital video, there is little noticeable difference between these delivery systems so long as they operate in normal mode. The difference between analog and digital video delivery systems becomes quite apparent, however, when one switches to trick-mode display.

When operating in trick-mode, an analog video delivery system, such as a video tape recorder, simply speeds up the rate at which the medium containing the video signal slides past a read head. To a first approximation, this results in a uniform compression of the temporal axis. A viewer thus sees all the action in the film being performed at a uniformly accelerated pace.

In contrast, a digital video delivery system operating in trick-mode generally does not show each image from the sequence of images making up the film. Instead, a trick-mode processor selects a subset of images from the film and transmits those images to a decoder for display to the viewer. Since these selected images are generally represented by differing amounts of data, they take varying amounts of time to reach the decoder and varying amounts of time to be processed by the decoder. The sum of the transmission time and the processing time is referred to as the "delivery interval."

When the decoder receives a first selected image, it decodes it and provides the resulting signal to the video input of a television for display to the viewer. The decoder repeatedly provides this signal to the video input until a second selected image becomes available for display. The viewer thus sees the first selected image while the decoder processes the second selected image. When the decoder completes processing the second selected image, it provides this new signal to the video input. The viewer then sees the second selected image.

The length of the time interval during which the viewer sees the first selected image thus depends on the time required to have the second selected image ready for display. Since the selected images can have very different sizes, this time interval can vary significantly. For example, if the second image is represented using only a very small amount of data, only a short time elapses before it is ready for display. Consequently, the viewer will see the first image for only a very short time before it is replaced by the second image. Conversely, if the second image requires considerable data for representation, a long time elapses before it is ready for display. Consequently, the viewer will see the first image for an extended period before it is finally replaced by the second image.

A digital video delivery system operating in trick-mode thus displays selected images for varying amounts of time. As a result, a viewer who activates trick-mode for a fixed number of seconds will advance or rewind the film by unpredictable amounts of time. This makes it difficult to judge, by watching the sequence of images go by, how much time has elapsed in the film. In addition, the subjective experience of watching a sequence of images in which each image is displayed for a seemingly random time can be unpleasant.

SUMMARY

The invention provides for the display of a video file in trick-mode by equalizing delivery intervals for the frames that are to be displayed. With the delivery intervals being substantially equal, images to be displayed in trick-mode are provided to a display device at a substantially uniform rate. This enables the display device to display each frame for substantially the same amount of time, thereby providing a smoother trick-mode display.

Generally, a digital video file includes an ordered sequence of frames to be displayed to a viewer. In one practice of the invention, digital video data for trick-mode display is derived from this sequence of frames by specifying an acceptable range of delivery intervals and generating a modified frame for trick-mode display of the selected frame. The modified frame includes data representative of the selected image, but modified for delivery at a delivery interval within the acceptable range of delivery intervals.

One method for facilitating the delivery of frames at a uniform rate is to specify a range of frame sizes on the basis of the acceptable range of delivery intervals and processing the data representative of the selected image to create a modified frame having a modified-frame size within the range of frame sizes. Depending on the amount of data representative of the selected image, this can include padding the data representative of the image to enable the modified-frame size to reach the lower limit of the specified range of frame sizes. Or, if there is too much data, this can include degrading the image by selectively reducing the amount of data representative of the image so that the modified-frame size falls below the upper limit of the specified range.

One way to selectively reduce the amount of data representative of the image is to discard selected high frequency coefficients from that data. This can be achieved directly by simply deleting those coefficients. However, this can also be achieved by changing a quantizer scale associated with the data representative of the selected image.

The image can be degraded uniformly, so that all portions of the image are degraded in the same way. Or, the degradation of the image can be selective, so that different portions of the image are degraded by different amounts. In the latter case, the image can be divided into zones, with each zone being weighted by a relative importance. The degradation for portions of the image that fall within a zone can then depend on the relative importance of that zone to the user's perception. In many cases, the zone of most importance is the central portion of an image. In such cases, it is preferable to degrade the peripheral portion of the image more than the central portion of the image.

The digital video data can be encoded in any manner. The method of the invention can be adapted to the trick-mode display of MPEG files, wavelet encoded files, and other files containing compressed video data.

When the digital video file is an MPEG file, the ordered sequence of frames can be a sequence of intra-coded frames. The sequence of modified frames can then be saved in a trick-file containing modified intra-coded frames. In one practice of the invention, these modified intra-coded frames are separated by frames specifying zero motion.

Where the selected frame contains interlaced video data, the method optionally includes removal of the interlacing so as to provide a more flicker-free display in trick-mode. In the case of an MPEG file, in which a frame includes two fields, this can include overwriting one field with the contents of the other.

To facilitate transitions between normal and trick-mode display of data, the method of the invention includes indexing the modified frame to the selected frame. This facilitates transition between a normal mode display, in which data representative of the image is obtained from the selected frame, and a trick-mode in which data representative of the image is obtained from the modified frame.

The invention also provides for two different video data sources: a first source for trick-mode display and a second source for normal mode display. In response to an instruction to transition from normal mode display of digital video data to trick-mode display, the method of the invention includes serving trick-mode data from the first source. In response to an instruction to transition from trick-mode display to normal mode display, the method includes serving normal mode data from the second source.

These and other features of the invention will be apparent from the following detailed description and the drawings, in which:

DETAILED DESCRIPTION

Figure 1:
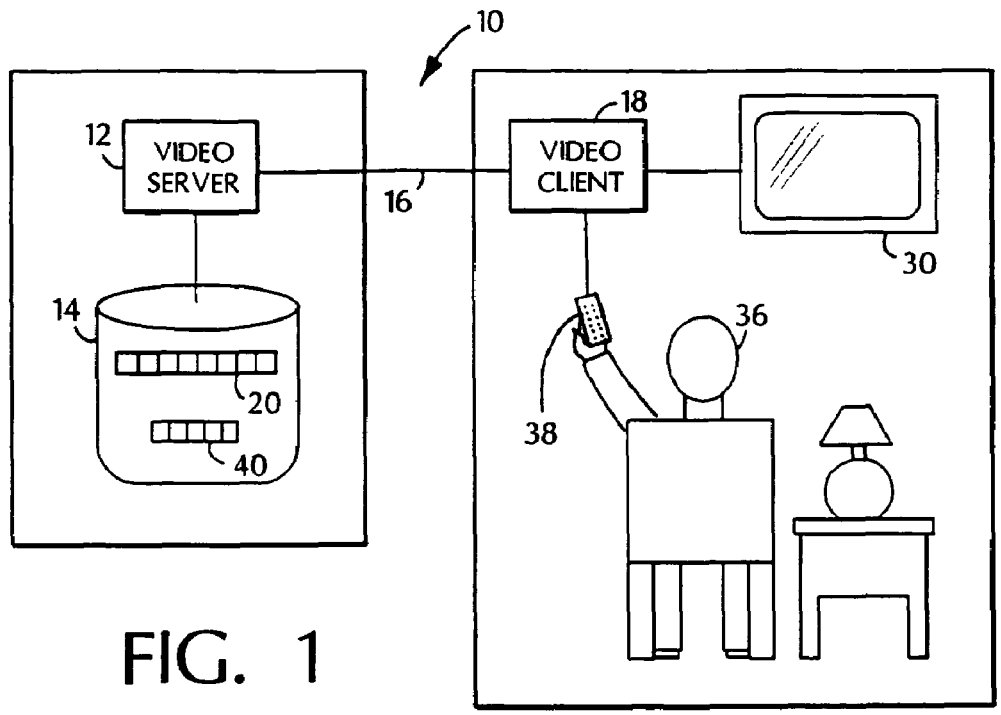
FIG. 1 shows a video delivery system for practice of the invention.

FIG. 1 shows a video delivery system 10 that includes a video server 12 in communication with both a mass-storage subsystem 14 and a high bandwidth data-communication network 16. The video server 12 is in communication with a large number of subscribing video clients through the data communication network 16. For simplicity, FIG. 1 illustrates a representative connection to one such video client 18.

Although shown schematically as a single disk, the mass-storage subsystem 14 is more typically an array of disks under the control of a RAID controller. However, the mass-storage subsystem 14 can be an optical disk, for example a DVD, or magnetic tape, or any other medium for data storage. The mass-storage subsystem 14 holds data representative of video content to be delivered to the video client 18 for real-time viewing. This video content is typically stored as a content file 20. Each content file 20 consists of a sequence of frames, each carrying data representative of an image. The content file 20 is typically an MPEG file, the structure of which is well-known and described in such publications as ITU-T Recommendation H.262, the contents of which are incorporated by this reference.

Figure 2:
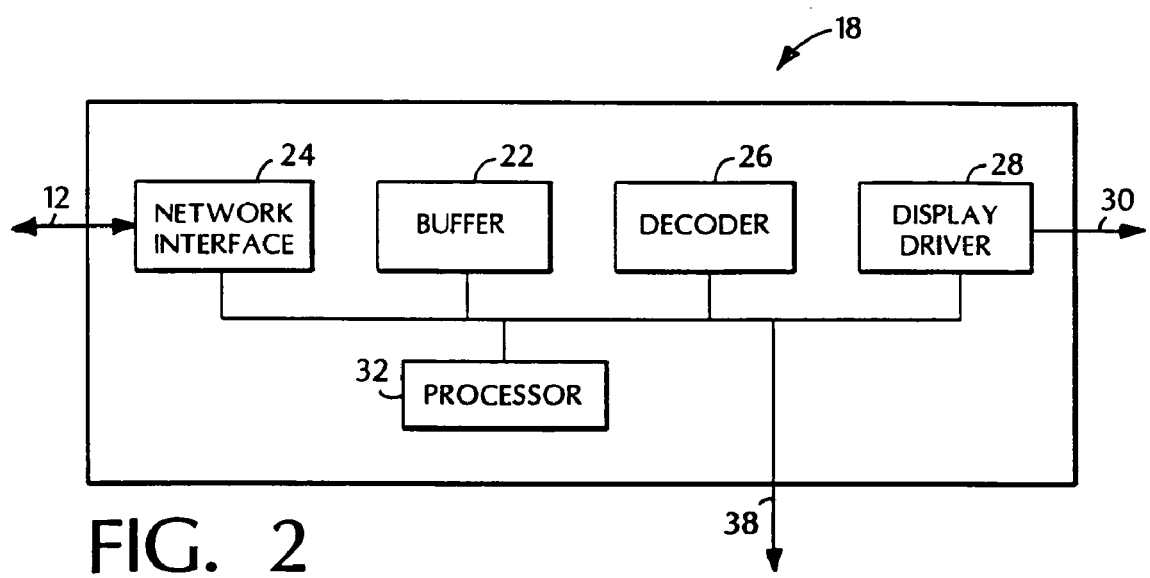
FIG. 2 is a more detailed diagram of the video client shown in FIG. 1.

The video client 18, shown in more detail in FIG. 2, includes a buffer 22 for temporary storage of one or more frames received from the video server 12 over a network interface 24. The buffer 22 is in communication with a decoder 26 that retrieves frames from the buffer 22 and recovers the data encoded into those frames. This recovered data is then provided to a display driver 28 for translation into a form suitable for delivery to a display device 30. A processor 32 controls the operation of the video client 18 in response to instructions received from a viewer 36 through a viewer-interface 38.

Using the viewer-interface 38, the viewer 36 issues instructions to perform such tasks as selecting the content to be played and initiating the play of that content in normal mode. Among the instructions that the viewer 36 can issue is an instruction to play the content in fast-forward or fast-backward mode. These two modes are collectively referred to as "trick-mode."

Figure 3:
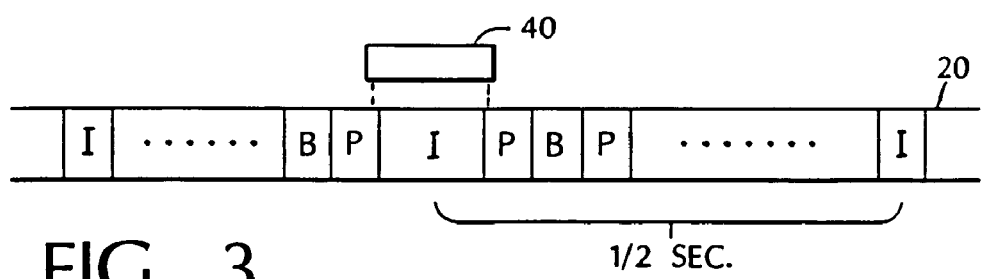
FIG. 3 is a schematic diagram of a disk-head reading a file on the mass-storage subsystem of FIG. 1.

In normal mode, the video server 12 retrieves frames from the MPEG content file 20 and transmits them to the video client 18. As shown in FIG. 3, these frames include "I" (intra-coded) frames separated from each other by approximately half a second of normal playback time. Each I-frame is thus a self-contained representation of an image.

The half-second of normal playback time between I-frames is filled with "P" (predictive) frames and "B" (bidirectional) frames. A P-frame encodes differences between its corresponding image and the image corresponding to a previous I- or P-frame. A B-frame encodes differences between its corresponding image and the image(s) corresponding to a previous and/or subsequent I- or P-frame. Consequently, unlike an I-frame, neither the P-frame nor the B-frame can be used in isolation to construct an image.

In a trick-mode display, only selected frames are displayed to the viewer. Because they can be decoded independently of any other frames, the frames selected for trick-mode display are typically I-frames. In a conventional trick-mode display, these frames are read directly from the content file 20 and provided to the decoder 26.

As noted above, a disadvantage of the conventional trick-mode display is that the I-frames contain differing amounts of data and therefore require different delivery intervals before being available for display. An additional disadvantage is that whenever a disk-head 40 reads data, it reads a fixed amount of data. As suggested by FIG. 3, this fixed amount of data may encompass not only an I-frame but portions of neighboring P-frames or B-frames. In normal mode, these portions of neighboring frames are eventually used because all frames are ultimately displayed. However, in trick-mode, these portions are discarded. Hence, the bandwidth required to retrieve and transmit them is wasted.

A system incorporating the invention includes separate trick-files 42a, 42b stored on the mass-storage subsystem. A forward trick-file 42a is used for fast-forward trick-mode display and a backward trick-file 42b is used for fast-backward trick-mode display. These trick-files 42a, 42b includes "T" (trick) frames that correspond to the I-frames in the content file 20. When operating in trick-mode, the video server 12 retrieves T-frames from the appropriate trick-file 42a, 42b rather than I-frames from the content file 20. Because each T-frame is potentially displayed to the viewer, the fact that the disk-head 40 may read portions of neighboring T-frames no longer represents a waste of bandwidth when operating in trick-mode.

While the illustrated embodiment specifies that frames selected for display in trick-mode be I-frames, it is possible to include P-frames or B-frames within the set of selected frames. Doing so provides smoother trick-mode display than can be achieved with I-frames alone, but at the cost of additional processing complexity.

Figure 4:
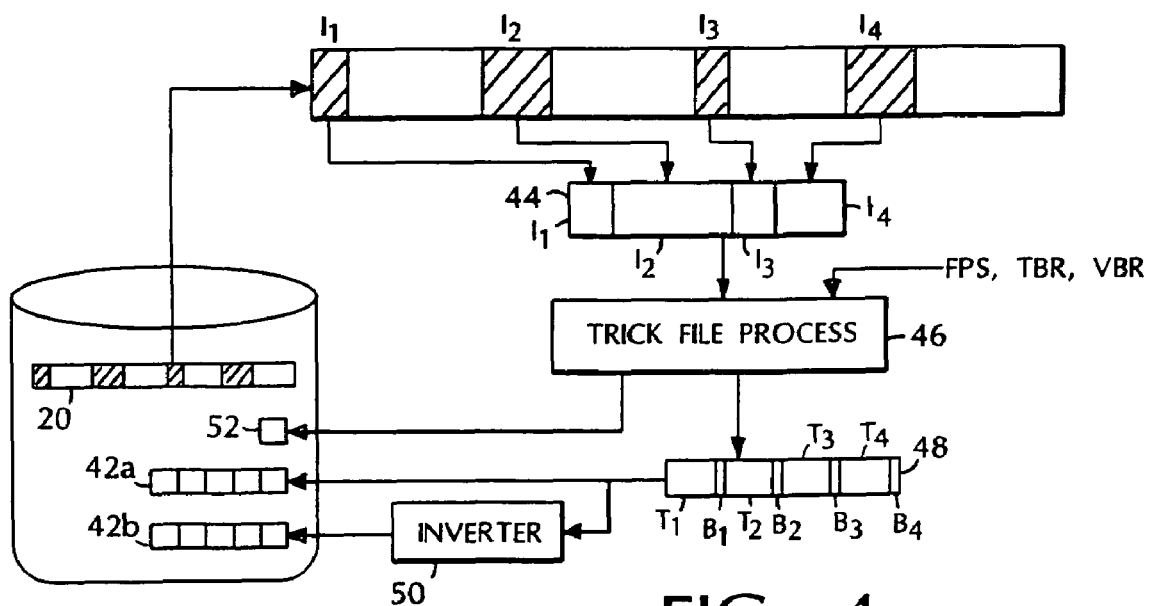
FIG. 4 illustrates the process of creating a trick-file corresponding to the content file shown in FIG. 1.

Referring now to FIG. 4, the trick-files 42a, 42b are created in advance by extracting the I-frames from an MPEG content file 20 to create an I-frame sequence 44. Each I-frame from the I-frame sequence 44 is then provided to a trick-file process 46. The trick-file process 46 modifies the data contained within the I-frame to ensure that the delivery interval for that data conforms to a range of specified delivery intervals. It does so by taking into account the number of frames per second ("FPS") that the display device expects, the transport bit rate ("TBR") for the network, and the video bit rate ("VBR").

The modified data generated by the trick-file process 46 is then used as a basis for constructing a T-frame. To enable it to be decoded transparently by any decoder, a T-frame is encoded in the same manner as an I-frame. It is referred to as a T-frame only to avoid confusion with the I-frame that is input to the trick-file process 46 to create it.

The T-frames generated by the trick-file process 46 are then interleaved with B-frames or P-franes specifying zero motion vectors. This causes the decoder 26 to simply repeat the preceding T-frame. The T-frames, together with the B-frames or P-frames interleaved between them, form a T-frame sequence 48. This T-frame sequence is written to the mass-storage subsystem as the forward trick-file 42a. A copy of the T-frame sequence 48 is then provided to an inverter 50 that rearranges the time-stamps associated with the T-frames to create the backward trick-file 42b. Both trick-files 42a, 42b have the same transport and video bit rates, the same picture resolution, and the same number of frames per second as the content file 20 from which they were derived. However, the time-stamps for the backward trick-file 42b will run in the opposite direction from those in the forward trick-file 42a.

The trick-file process 46 also creates an index file 52 that correlates T-frames in the trick-files 42a, 42b with their corresponding I-frames in the content file 20. The index file 52 enables the video server 12 to know which frame to retrieve from the appropriate trick-mode file 42a, 42b when the viewer 36 issues an instruction to display in trick-mode and which frame to retrieve from the content file 20 when the viewer 36 issues an instruction to revert to normal mode.

Figure 5:
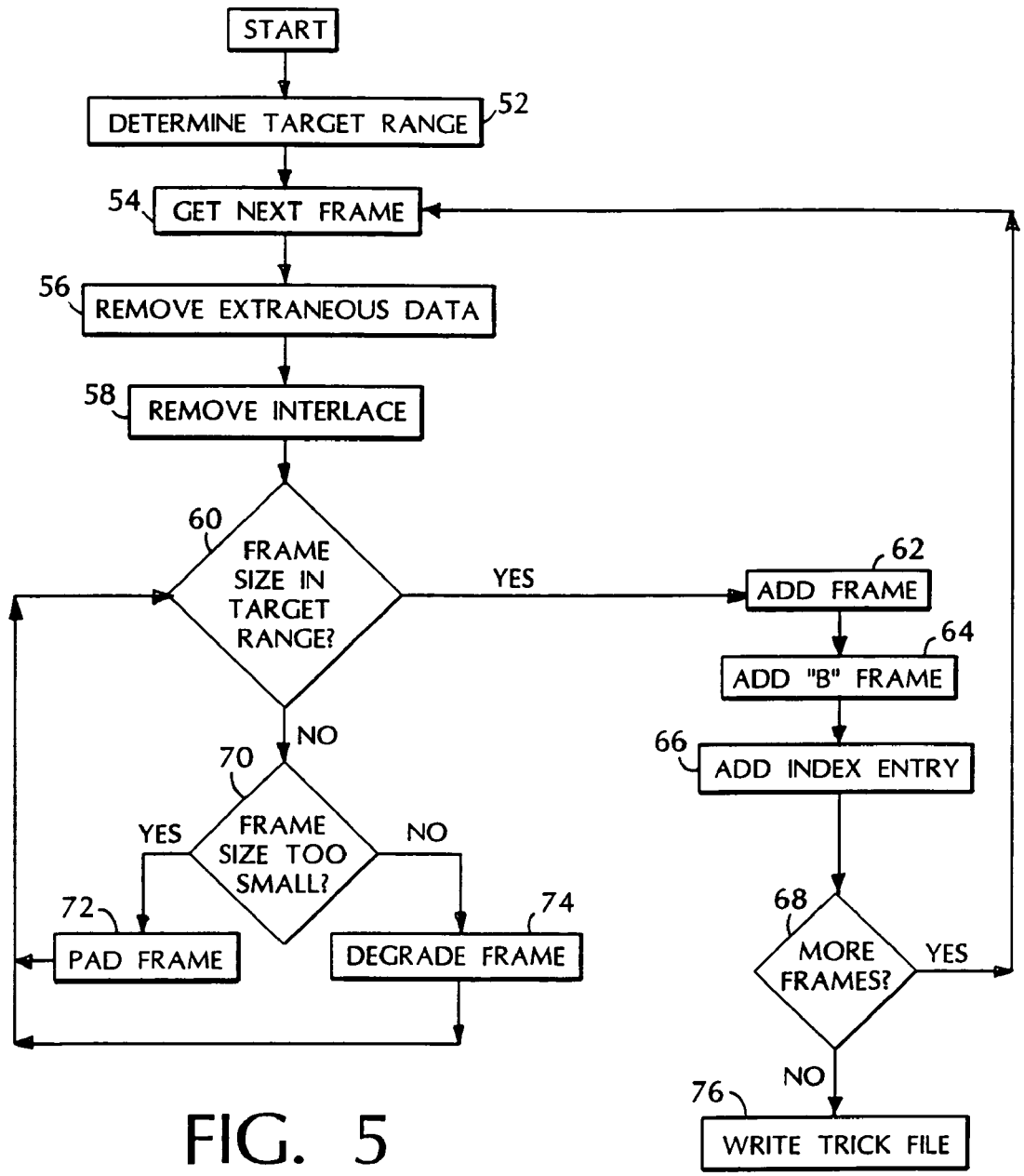
FIG. 5 is a flowchart of the manner in which video data from the content file of FIG. 1 is modified to achieve a substantially uniform delivery rate in trick-mode.

FIG. 5 illustrates the method used by the trick-file process 46 to modify I-frames to generate corresponding T-frames. The method begins with the evaluation 52 of the allowable range of sizes for the resulting T-frames. This allowable range of sizes is calculated from the allowable range of delivery intervals on the basis of the number of frames per second that the display device expects, the transport bit rate for the network, and the video bit rate. The trick-file process then retrieves 54 an I-frame from the content file and removes 56 any extraneous null padding or user data that is encoded in that I-frame.

Where the content file encoded as interlaced rather than as progressive scan, the I-frame consists of two fields to be displayed 1/60 second apart (in the case of display devices operating at 30 fps). To avoid an unpleasant flickering effect when the display device repeatedly switches back and forth between the two fields, the method includes the optional step of overwriting 58 the contents of one field with the contents of the other field. This step is unnecessary when the content file is encoded as progressive scan.

The trick-file process then determines 60 whether the amount of data in the I-frame is such that the delivery interval for that I-frame is within the allowable range. If the amount of data is such that this is the case, then the I-frame is added 62 to the trick-file sequence, a B-frame (or a P-frame) is added 64 after the I-frame (now referred to as a T-frame), and an entry is made 66 in the index file. The trick-file process then determines if there are any additional I-frames to process 68. If there are no additional I-frames to process, the trick-file process writes 69 the trick-file to the mass-storage subsystem.

In an optional practice of the invention, the trick-file is written incrementally, with additional T-frames being added to the trick-file as they are generated. The practice of incrementally writing the trick-file enables the implementation of trick-mode display of live-broadcasts.

If the I-frame contains too little data 70, the delivery interval for that I-frame will be too short. Under these circumstances, the trick-file process creates a corresponding T-frame by adding null padding to the I-frame 72. The trick-file process then checks the size of the padded frame 60 and, if the size is within the allowed range, proceeds to add 62 that frame to the trick-file sequence and to carry out the subsequent steps as described above. Alternatively, null transport packets are added to the trick-file to consume additional space and to thereby postpone the time at which the excessively short I-frame will be available for display.

If the I-frame contains too much data, the delivery interval for that I-frame will be too long. Under these circumstances, the trick-file process creates a corresponding T-frame by selectively removing data from the I-frame 74.

An image encoded into an MPEG file is divided into a large number of macroblocks, each of which corresponds to a portion of the image. Each macroblock is then subjected to a discrete cosine transform (DCT), the result of which is a table of DCT coefficients representative of the amplitudes of the various spatial frequency components that make up that portion of the image represented by the macroblock. To achieve further compression, these amplitudes can be scaled down, thereby enabling them to be represented by a smaller number of bits. This is achieved in a quantization step in which each DCT coefficient in a macroblock is divided by a corresponding entry from a quantization table. This step is referred to as "quantization" because, as a result of round-off and truncation inherent in integer division, a DCT coefficient may not be recoverable in its original pre-quantization form. As a result, this step introduces a quantization error. By adjusting this quantization error, the trick-file process can adjust the size of the frame.

In one practice of the invention, the trick-file process scales the entries in the quantization table used in originally encoding the "I" frame. The DCT coefficients are then re-quantized using the scaled quantization table and the resulting re-quantized DCT coefficients are used to encode the "T" frame. The quantization table is scaled such that the re-quantized DCT coefficients are representable with fewer bits than the originally quantized DCT coefficients. This enables the resulting T-frame to include less data and to therefore have a shorter delivery interval.

The foregoing re-quantization results in additional image degradation. To minimize the perception of image degradation, different quantization tables can be used for different portions of the image. For example, since the central zone of the image is often where a viewer's attention is focused, the quantization tables for macroblocks from the central zone can be altered only slightly or not at all. Macroblocks from the periphery of the image could then be altered to degrade those portions of the image far more than would be tolerable in the central zone of the image.

Stated more generally, an image can be divided into two or more zones, each of which has a weight indicative of the attention that image is likely to receive from a viewer. The quantization table to be used for requantizing a macroblock can then be made a function of what zone that macroblock lies within. In the above example, there are two zones, with the more perceptually important zone being the center of the image. However, the perceptually important zone can be anywhere in the image.

In practice, there may exist I-frames for which the re-quantization process described above reduces the amount of data so much that the resulting T-frame is too small. Alternatively, the re-quantization process may not succeed in reducing the amount of data sufficiently. The frame degradation step 74 is thus followed by re-execution of the loop that begins with the step of determining 60 whether the frame size is within a target range.

The foregoing description discloses an implementation in the context of an MPEG-2 file. However, the method is clearly applicable to digital video that is encoded in other MPEG formats (such as MPEG-4) and using other compression methods. For example, digital video compressed using wavelet transforms rather than discrete cosine transforms also can be displayed in trick-mode using the method described herein.

Having described the invention, and a preferred embodiment thereof, what is claimed as new and secured by letters patent is:

1. A method for processing digital video data for trick-mode display, said digital video data having an ordered sequence of frames, said method comprising:
   specifying a range of delivery intervals;
   selecting a set of frames from said ordered sequence of frames, each frame in said selected set including data representative of a selected image and associated with a corresponding delivery interval; and
   for each frame in the selected set, generating a modified frame for trick-mode display according to whether the corresponding delivery interval of said selected frame is less than a lower bound of the range or greater than an upper bound of the range, said modified frame including data representative of said selected image modified for delivery at a delivery interval within said range of delivery intervals.

2. The method of claim 1 further comprising including said modified frame in a sequence of modified frames to be displayed in trick-mode.

3. The method of claim 2 further comprising saving said sequence of modified frames in a trick-file.

4. The method of claim 3 wherein saving said sequence comprises saving said trick-file in a mass-storage subsystem.

5. The method of claim 4 further comprising selecting said mass-storage subsystem from a group consisting of: a magnetic disk, an optical disk, and a magnetic tape.

6. The method of claim 3 wherein said digital video file is an MPEG file and saving said sequence of modified frames in a trick-file comprises interleaving said modified frames with frames specifying zero motion.

7. The method of claim 2 further comprising transmitting said sequence of modified frames to a video client.

8. The method of claim 1 wherein generating a modified frame comprises
   specifying a range of frame sizes on the basis of said specified range of delivery intervals; and
   processing said data representative of said selected image to create a modified frame having a modified-frame size within said range of frame sizes.

9. The method of claim 8 wherein processing said data representative of said selected image comprises padding said data to enable said modified-frame size to be within said specified range of frame sizes.

10. The method of claim 9 wherein padding said data comprises adding null packets to said data.

11. The method of claim 8 wherein processing said data representative of said selected image comprises degrading said data representative of said selected image such that said modified frame size is less than an upper bound of said range of frame sizes.

12. The method of claim 11 wherein degrading comprises discarding selected high frequency coefficients from said data representative of said selected image.

13. The method of claim 11 wherein degrading comprises changing a quantizer scale associated with said data representative of said selected image.

14. The method of claim 11 wherein degrading comprises
   selecting a first portion of said selected image;
   selecting a second portion of said selected image; and
   degrading data representative of said first portion differently from data representative of said second portion.

15. The method of claim 14 further comprising selecting said second portion to be a central portion of said selected frame and selecting said first portion to be a peripheral portion of said selected frame.

16. The method of claim 1 further comprising selecting said digital video file to be an MPEG file.

17. The method of claim 16 further comprising selecting said ordered sequence of frames to be a sequence of intra-coded frames.

18. The method of claim 1 further comprising selecting said digital video file to include an image encoded by a wavelet transform.

19. The method of claim 1 wherein said selected frame includes interlaced video data and said method further comprises removing said interlaced data.

20. The method of claim 19 wherein removing said interlaced video data from said frame comprises overwriting a second field of said frame with a first field of said frame.

21. The method of claim 1 further comprising indexing said modified frame to said selected frame thereby enabling transition between a normal mode, in which data representative of said image is obtained from said selected frame, and a trick-mode in which data representative of said image is obtained from said modified frame.

22. The method of claim 1 wherein said range of delivery intervals is a range of substantially equal delivery intervals.

23. Computer-readable media having encoded thereon software for processing digital video data for trick-mode display, said software including instructions for causing a computer to:
   receive a range of delivery intervals;

select a set of frames from an ordered sequence of frames from said digital video data, each frame in said selected set being associated with a corresponding delivery interval; and for each frame in the selected set, generate a modified frame for trick-mode display according to whether the corresponding delivery interval of said selected frame is less than a lower bound of the range or greater than an upper bound of the range, said modified frame including data representative of said selected image modified for delivery at a delivery interval within said range of delivery intervals.

24. The computer-readable media of claim 23 wherein said range of delivery intervals is a range of substantially equal delivery intervals.

* * * * *